United States Patent [19]

Thomas

[11] 3,746,798

[45] July 17, 1973

[54] ELECTRONIC RING TRIP CIRCUIT

[75] Inventor: Robert M. Thomas, Brockville, Ontario, Canada

[73] Assignee: GTE Automatic Electric Laboratories Incorporated, Northlake, Ill.

[22] Filed: May 23, 1972

[21] Appl. No.: 256,103

[52] U.S. Cl. .......................... 179/18 HB, 179/84 A

[51] Int. Cl. .......................... H04m 3/04

[58] Field of Search .................. 179/18 F, 18 FA, 179/18 HB, 84 R

[56] References Cited

UNITED STATES PATENTS 3,341,665 9/1967 Merkel et al. .................. 179/84 R

*Primary Examiner*—Thomas W. Brown

*Attorney*—K. Mullerheim, B. E. Franz et al.

[57] ABSTRACT

A circuit to detect the off-hook condition of a telephone subscriber station after the application of ringing current to operate the station signaling device. The circuit employs a pair of light emitting diodes, connected in an inverse parallel configuration, in series with one of the line conductors and light coupled to a pair of associated photo transistors. The photo transistors operate to alternately charge and discharge an RC circuit in response to the passage of an A.C. ringing current through the line, but upon detecting a direct current flow in the line conductor bring the RC circuit to a fully charged state to trip a load circuit to remove the ringing current from the line.

4 Claims, 1 Drawing Figure

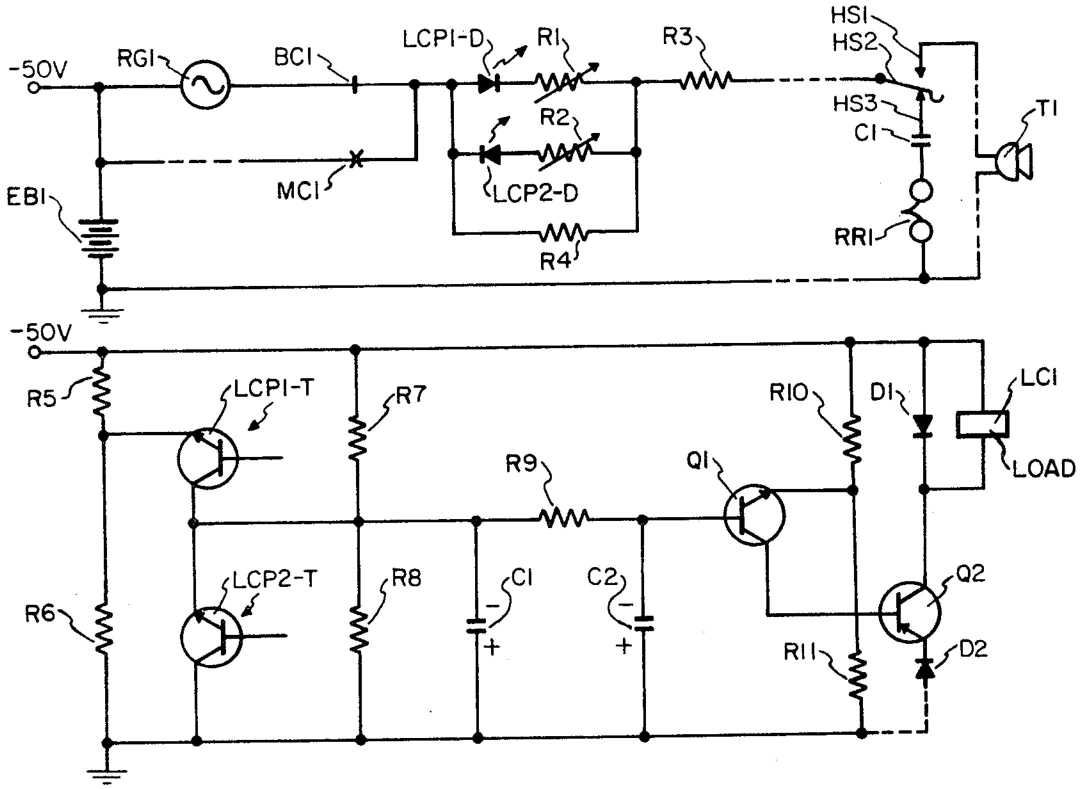
-50V
RGI
BCI
LCPI-D
RI
R3
HSI
HS2
HS3
CI
TI
R2
LCP2-D
MCI
EBI
R4
RRI
-50V
R5
LCPI-T
R7
RIO
DI
LCI
LOAD
R9
QI
R6
LCP2-T
R8
CI
C2
Q2
RII
D2

ELECTRONIC RING TRIP CIRCUIT

BACKGROUND OF THE INVENTION

1. Field of the Invention

This invention pertains to telephone central office line monitor circuits and more particularly to ring cut-off circuits connected to telephone station lines.

2. Description of the Prior Art

In the telephone industry, a subscriber being called is summoned to the phone by the ringing of a bell which results from the application of a ringing signal to the line. This ringing signal is of a considerably higher voltage than the normal alternating current carrying the voice signals via said line. Thus it is important to remove these ringing signals as rapidly as possible upon the subscriber responding to them by lifting the handset of the station apparatus. To detect this off-hook condition of the subscriber station apparatus the telephone equipment normally employs relays that respond to the flow of a direct current in the line, but not to the alternating current of the ringing signal.

This relay type of ring trip provided satisfactory service for many years. But, as the telephone companies attempted to extend the distances from the central office that the stations were to be located, difficulty was experienced in obtaining reliable operation over a variety of line loop conditions. Among the features desired was an increased sensitivity and faster response. To achieve these goals the use of electronic circuitry was investigated.

Electronic techniques have been used to perform various functions in telephone exchanges. An additional problem that exists in the application of electronic devices to telephone lines is the existence of high potentials that may appear on the line due to lightning, power-line crosses or numerous other undesirable conditions. These high potentials can destroy sensitive electronic devices. Various forms of light coupling have been used for isolation. See for example U.S. Pat. Nos. 3,341,665; 3,469,036 and 3,410,961.

SUMMARY

An object of this invention is to use electronic techniques for the ring-trip function. Accordingly, this circuit uses optical couplers consisting of light-emitting diodes to monitor the current flowing through the line. These diodes are optically coupled to photo transistors in the electronic circuitry to thereby provide isolation from external high voltages.

BRIEF DESCRIPTION OF THE DRAWING

The single FIGURE is a schematic diagram of a ring-trip circuit connected to a source of ringing current and to a subscriber's line.

DESCRIPTION OF THE PREFERRED EMBODIMENT

In order that the invention be disclosed in a clear and concise manner, the disclosure has been simplified by omitting those portions of the telephone system not directly related to the ring-trip function. It is understood that those skilled in the telephone art may readily add the associated circuitry to the circuits shown in the drawing, in a well known manner in the art.

Referring now to the drawing there is shown a ring-trip circuit in a telephone subscriber station loop. In the circuit shown, battery-connected ringing is assumed. The ringing generator RG1 is shown in the series path from the negative terminal of the exchange battery EB1 through break contacts BC1 to the multipled paths of a first light emitting diode LCP1–D poled anode to cathode away from the ringing generator and an adjustable resistor R1 in series; a second light emitting diode LCP2–D poled cathode to anode away from the ringing generator and an adjustable resistor R2 in series; and a resistor R4. This entire multiple path is in series with resistor R3 through the line conductors to the substation. At the subscriber station the path passes through the hookswitch break contacts, HS2 and HS3, a capacitor C1 through the station ringer RR1 and via the positive line conductor back to the positive terminal of the exchange battery EB1.

The electronic circuitry is isolated from the above recited basic path by the pair of opto-isolators LCP1 and LCP2 which include light emitting diodes LCP1–D and LCP2–D as well as the transistors LCP1–T and LCP2–T. In this structure the NPN silicon planar photo transistor is coupled to the diffused planar gallium arsenide diode. The diode light emission varies with the current flow therethrough to control the current flow through the photo transistor. The feature of this unit is its high isolation resistance and high voltage isolation between the emitter and detector. A typical such unit used in an embodiment of the present disclosure is manufactured by the Monsanto Company and is designated MCT2.

A first voltage divider consisting of resistors R5 and R6 connected between the −50 volt and ground potential source is used to set the proper operating level for the photo transistors. The photo transistors are connected in series from the junction of the two resistors through the emitter to collector path of LCP1–T and LCP2–T to the ground bus. The junction between the collector of LCP–T and the emitter of LCP2–T is connected to the junction of resistors R7 and R8. These latter two resistors are also connected across the negative and ground supply busses. A capacitor C1 is shown connected from the junction of the resistors R7 and R8 to the ground bus. The voltage divider consisting of these resistors R7 and R8 establishes a resting direct current bias of about 12 volts on capacitor C1. When an alternating current from the ringing generator RG1 is flowing in the line, the transistors LCP–T and LCP2–T conduct on alternate half cycles, to alternately add and remove a charge from capacitor C1. Since the characteristics of the light coupled pairs are such that collector current is proportional to diode current, an alternating current causes no change in the effective direct current voltage on capacitor C1. Resistors R1 and R2 in series with the diodes are adjusted to compensate for differences in the diode characteristic. The network of resistor R9 connected from the junction of resistors R7 and R8 and capacitor C1, with capacitor C2 is interposed to remove any residual ripple from being applied to the base of transistor Q1. Transistors Q1 and Q2 amplify the changes in the charge level of capacitor C1. Transistor Q1 has its emitter connected to the junction of the voltage divider resistors R10 and R11. Its collector is connected through the base emitter path of transistor Q2 and the cathode to anode path of diode D2 to positive potential, through additional control circuitry shown by the dotted lines. The collector of transistor Q2 is connected through a load shown here as a relay LC1 to the negative potential bus. A diode is shown across the relay coil LC1 to absorb the inductive kicks upon the collapse of its magnetic field. The transistors Q1 and Q2 are normally cut off because the emitter voltage of Q1 is held to about a negative 10 volts by the voltage divider of resistors R10 and R11.

A direct current appearing on the line upon the subscriber answering and removing his receiver to operate the associated hookswitch and closing contacts HS1 and HS2 completes a direct current path. The average diode current in LCP2–D will be increased and the current in diode LCP1–D will be decreased. This results in the voltage on capacitor C1 moving toward ground, which in turn drives transistors Q1 and Q2 towards saturation. Transistor Q2 is shown connected to a relay coil LC–1 which is then effective to cut-off the ringing current and establish a talking connection at contacts BC1 and MC1 respectively.

What is claimed is:

1. In a ring cut-off arrangement of the type comprising switching means interposed in the ringing circuit to operate in response to said circuit being traversed by direct current, but to remain unoperated when said circuit is traversed by alternating ringing current alone, the improvement being that said switching means comprises: first and second light emitting diodes connected in inverse parallel in series in said ringing circuit to alternately glow as they alternately conduct the ringing signal, and only one of them glow during the flow of a direct current in said circuit, a source of operating potential having a first and a second terminal, a first and a second resistor in series and connected across said operating potential terminals, a capacitor connected at one end to said first one of said operating potential terminals, and means connecting the other end of said capacitor intermediate said first and second resistors whereby said capacitor is maintained at a first nominal charge level by said resistors, first and second two terminal light sensitive switch means of the type adapted to be rendered conductive when illuminated, respectively operatively associated with said light emitting diodes and connected in series across said operating potential terminals, other means connecting the junction of said two light sensitive switch means to the other end of said capacitor, said light sensitive switches responding to the glow from said associated diodes to alternately raise and lower the nominal charge state of said capacitor during the flow of an alternating current in said circuit, only one of them remaining conductive to increase the charge of said capacitor during the flow of a direct current in said circuit, and switch means responsive to the increased charge of said capacitor to remove said ringing current from said circuit.

2. In a ring cut-off arrangement according to claim 1 further including a resistor in parallel with said light emitting diodes to increase the current carrying capabilities of said circuit.

3. In a ring cut-off arrangement according to claim 2 including a variable resistor in series with each said light emitting diode to compensate for inequalities in their characteristics.

4. In a ring cut-off arrangement according to claim 3 wherein said switch means includes an amplifier operatively connected to said capacitor other terminal responding to said increased charge on said capacitor to increase its output, a relay having break contacts in said circuit and operated in response to said amplifier increased output to remove said ringing current from said circuit.

* * * * *